J. Donlevy,
Type.
No. 53,587.
17 Sheets. Sheet 3.
Patented Apr. 3. 1866.
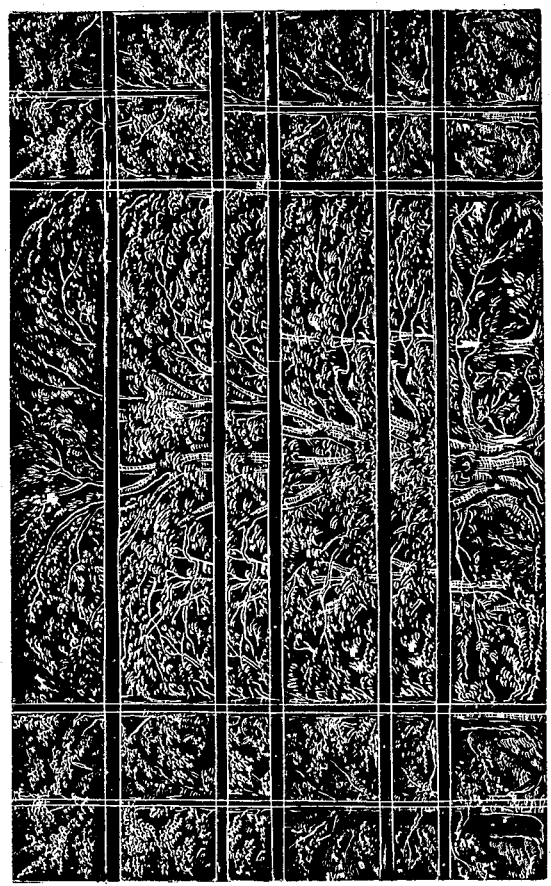
Witnesses
S. D. Law
M. N. Hutchinson
John Donlevy J. Donlevy,
Type.
No. 53,587.
17 Sheets, Sheet 4.
Patented Apr. 3, 1866.
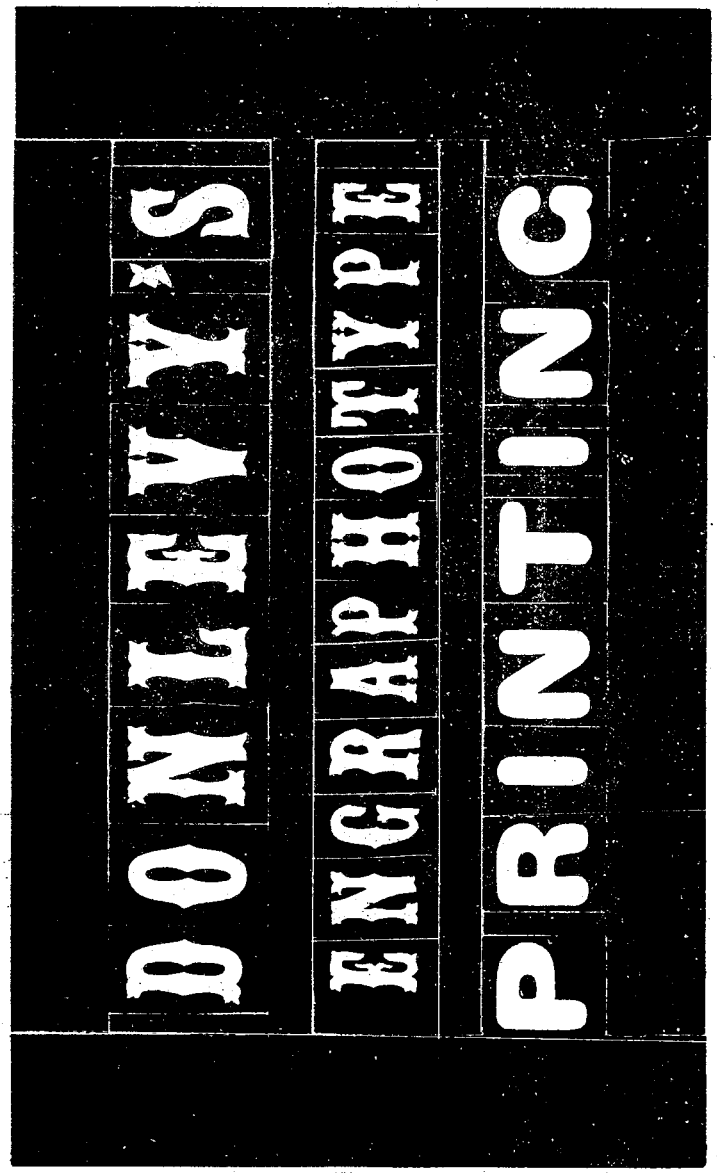
Witnesses
J. D. Law
M. N. Hutchinson
John Donlevy J. Donlevy, Type.

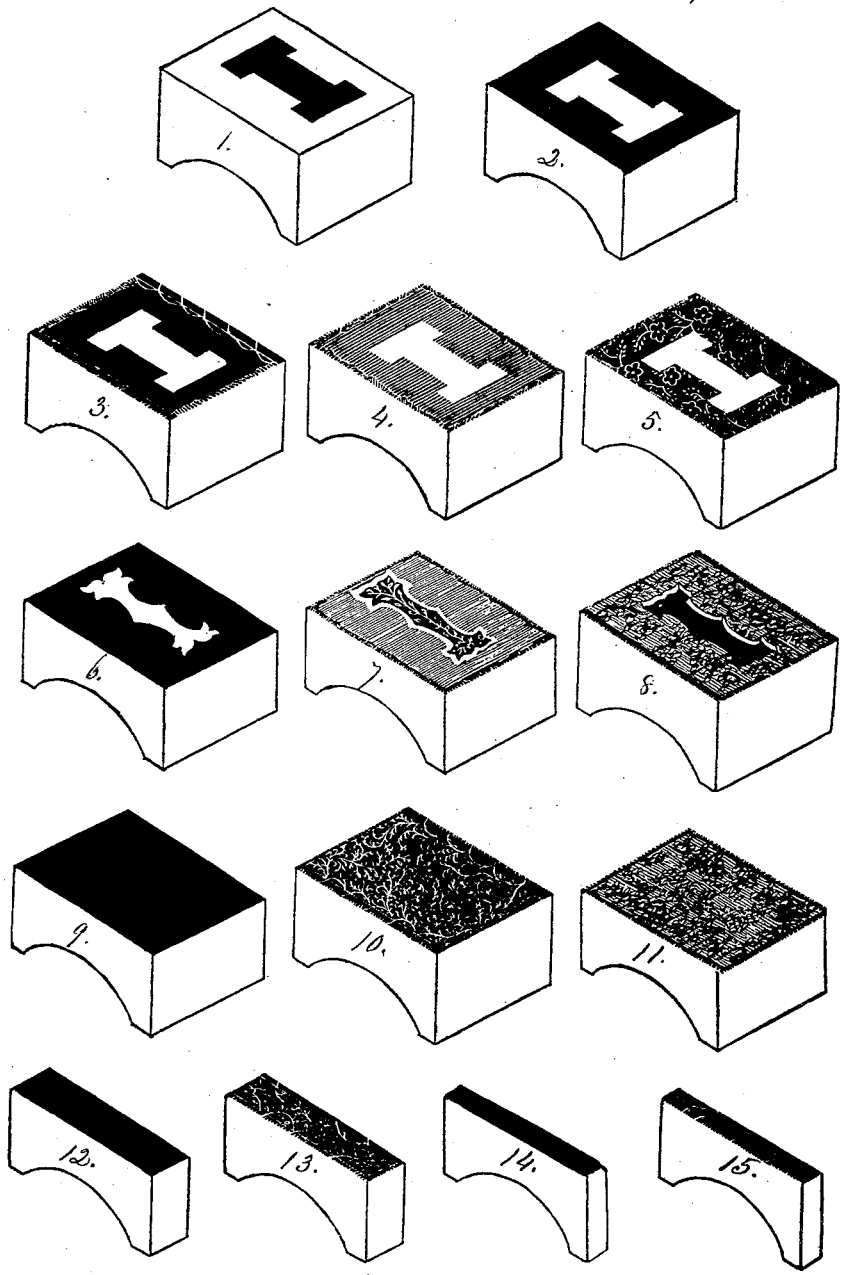

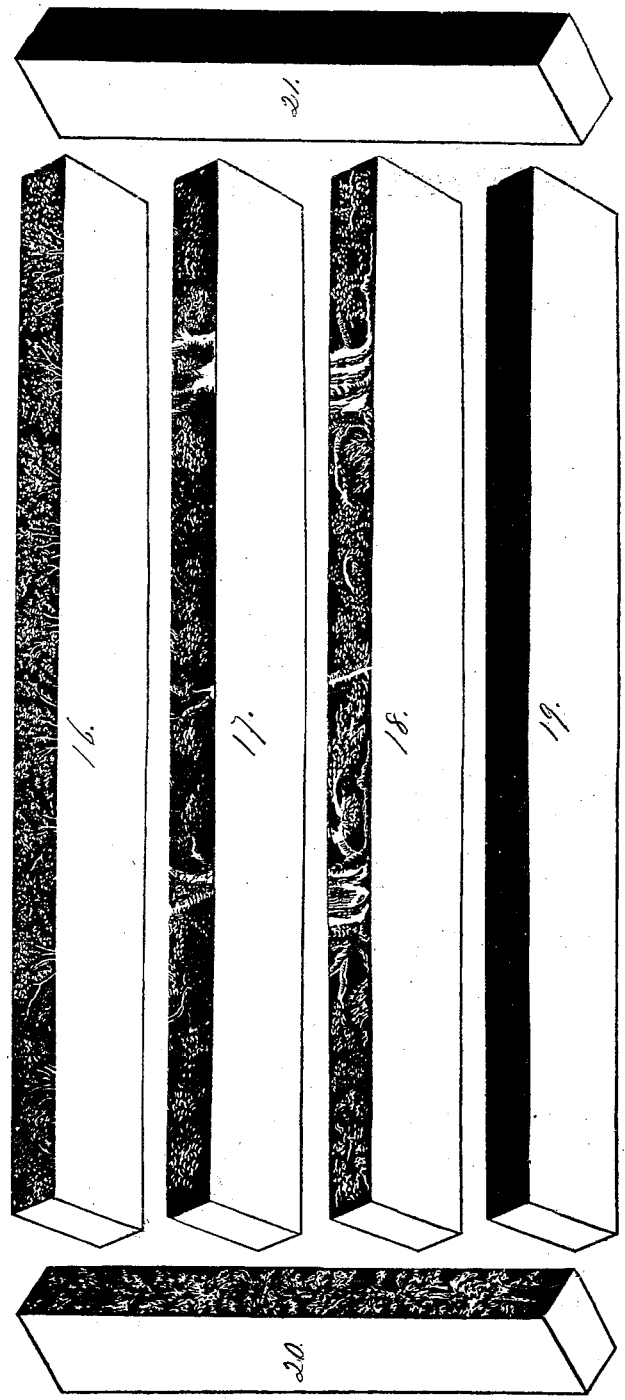

No. 53,587.

17 Sheets, Sheet 5.

Patented Apr. 3, 1866.

DONLEVY'S ENGRAPHOTYPE PRINTING

Witnesses:
J. D. Law
M. N. Hutchinson

John Donlevy

J. Donlevy,
Type.
No. 53,587.
17 Sheets, Sheet 6.
Patented Apr. 3, 1866.
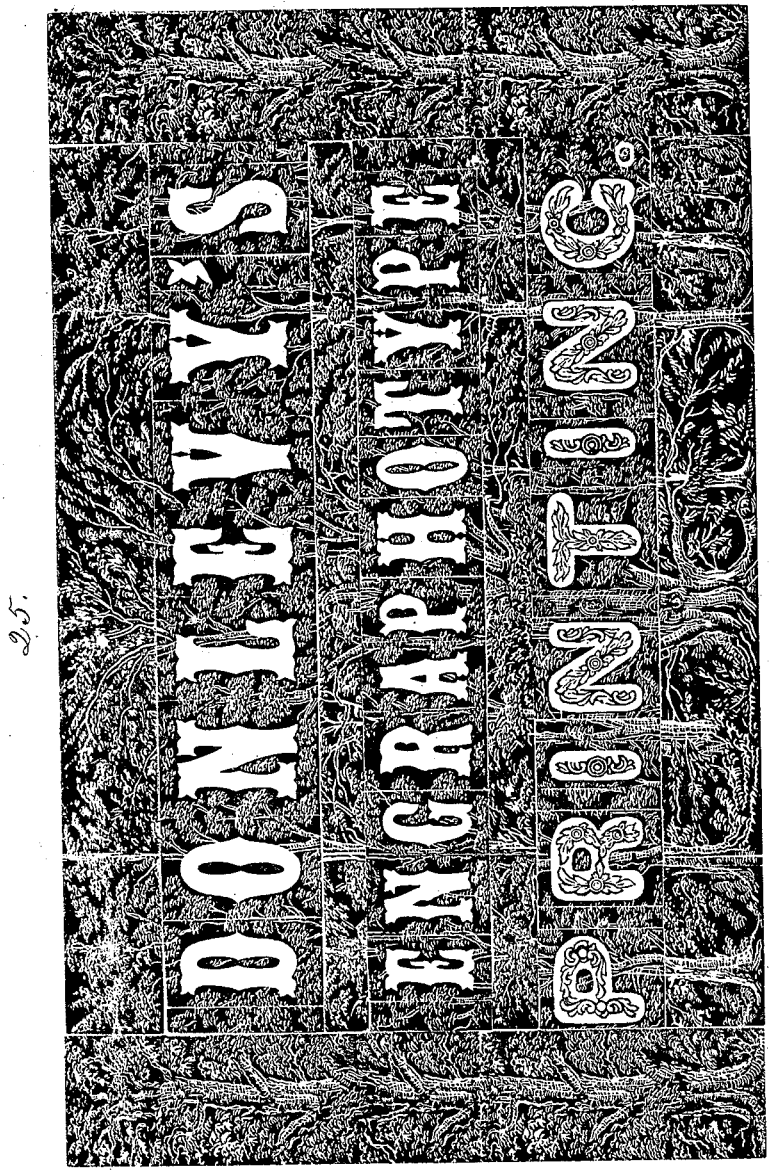
Witnesses
J. D. Law
M. N. Hutchinson
John Donlevy J. Donlevy,
Type.
No. 53,587.
17 Sheets, Sheet 7.
Patented Apr. 3, 1866.
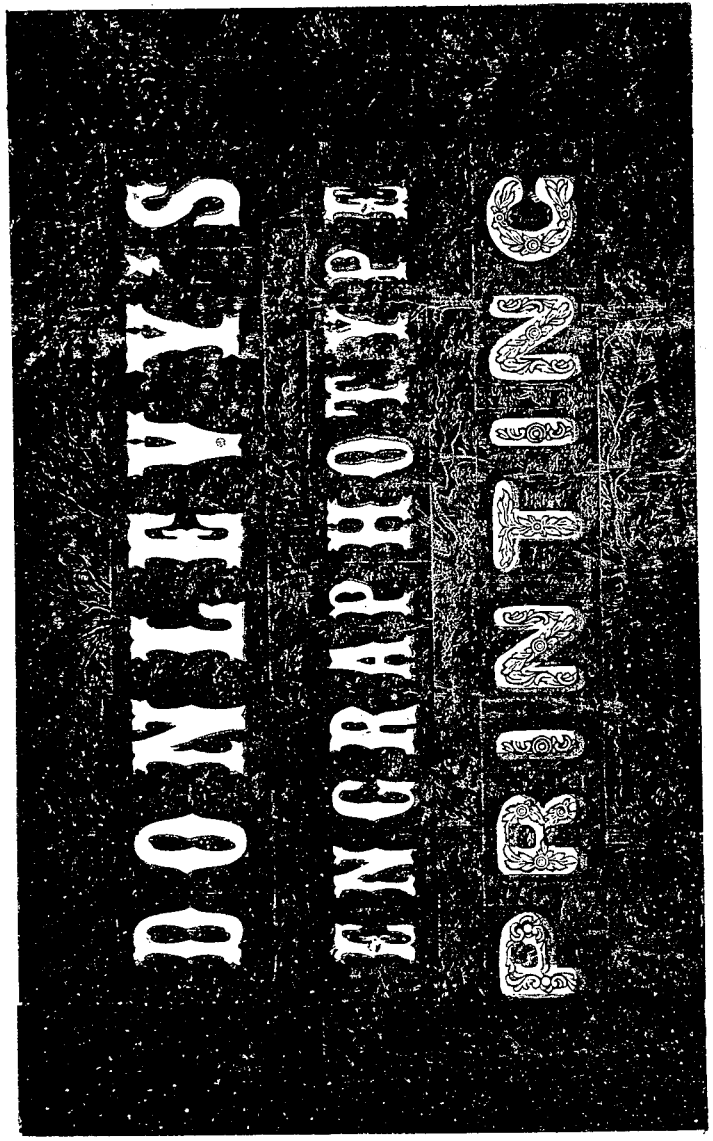
Witnesses
J. D. Law
M. N. Hutchinson
John Donlevy J. Donlevy,
Type.
17 Sheets, Sheet 8.
No. 53,587.
Patented Apr. 3, 1866.
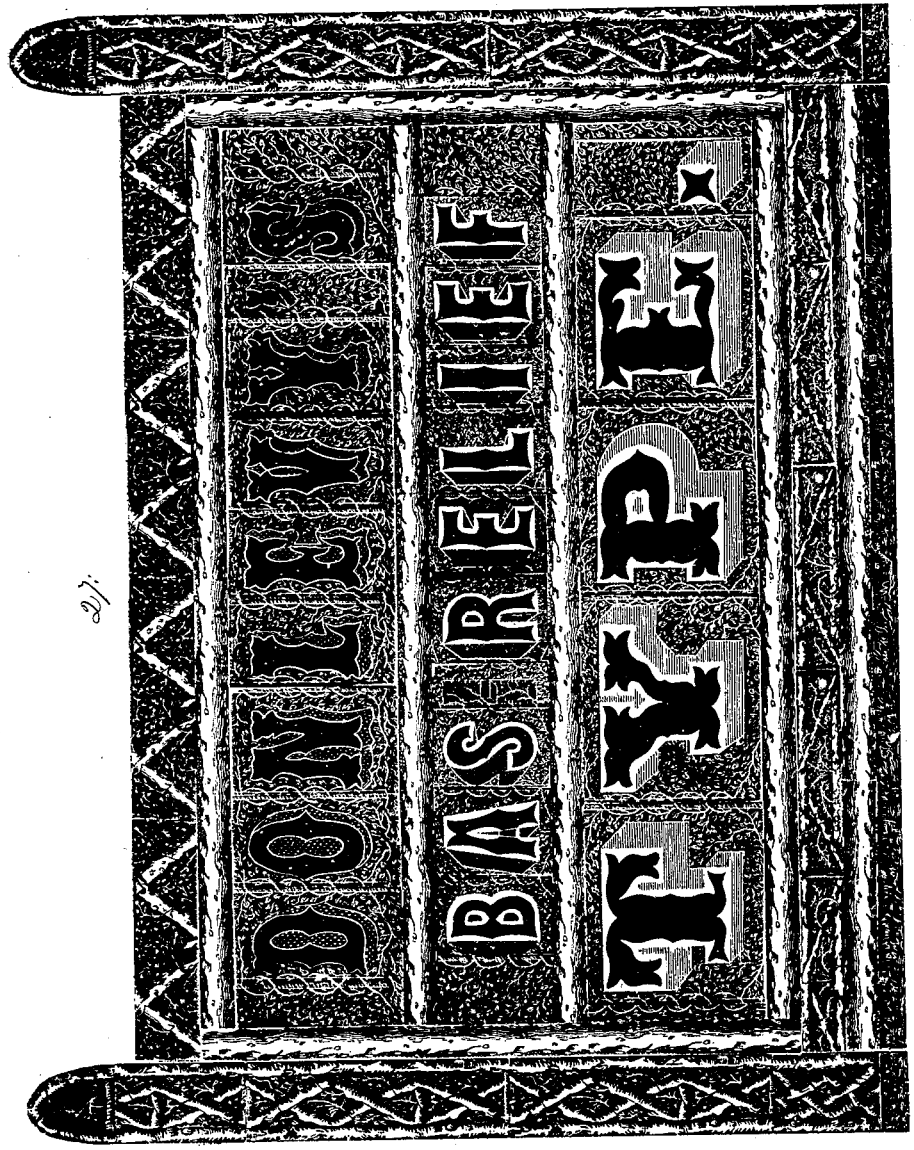
Witnesses
T. D. Law
M. N. Hutchinson
John Donlevy J. Donlevy,
Type.
No. 53,587.
17 Sheets. Sheet 9.
Patented Apr. 3. 1866.
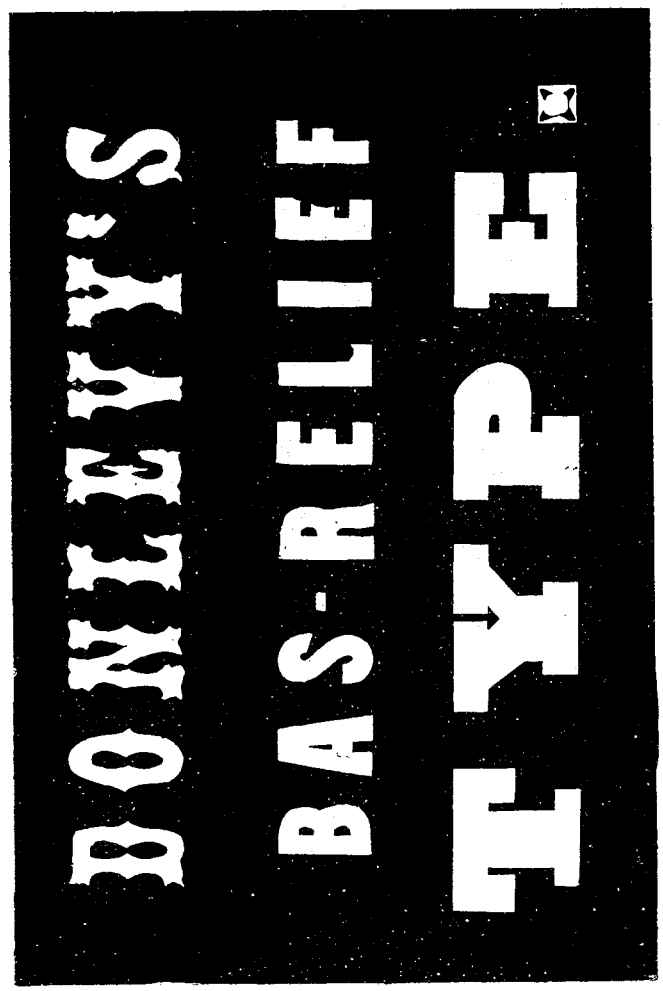

J. Donlevy,
Type.

No. 53,587.

17 Sheets — Sheet 11.

Patented Apr. 3, 1866.

30.

DONLEVY'S
INTAGLIO·TINT
TYPOGRAPHY.

31.

DONLEVY'S
INTAGLIO·TINT
TYPOGRAPHY.

Witnesses:
S. D. Law
M. N. Hutchinson

John Donlevy

J. Donlevy,
Type.
No. 53,587.
17 Sheets, Sheet 12.
Patented Apr: 3, 1866.
Witnesses
J. D. Law
M. N. Hutchinson
John Donlevy
N. PETERS, PHOTO-LITHOGRAPHER, WASHINGTON, D. C.

J. Donlevy,
Type.
No. 53,587.   Patented Apr. 3, 1866.
John Donlevy

J. Donlevy,
Type.
No. 53,587.
17 Sheets, Sheet 14.
Patented Apr. 3, 1866.
John Donlevy J. Donlevy,
Type.
No. 53,587. Patented Apr. 3, 1866.
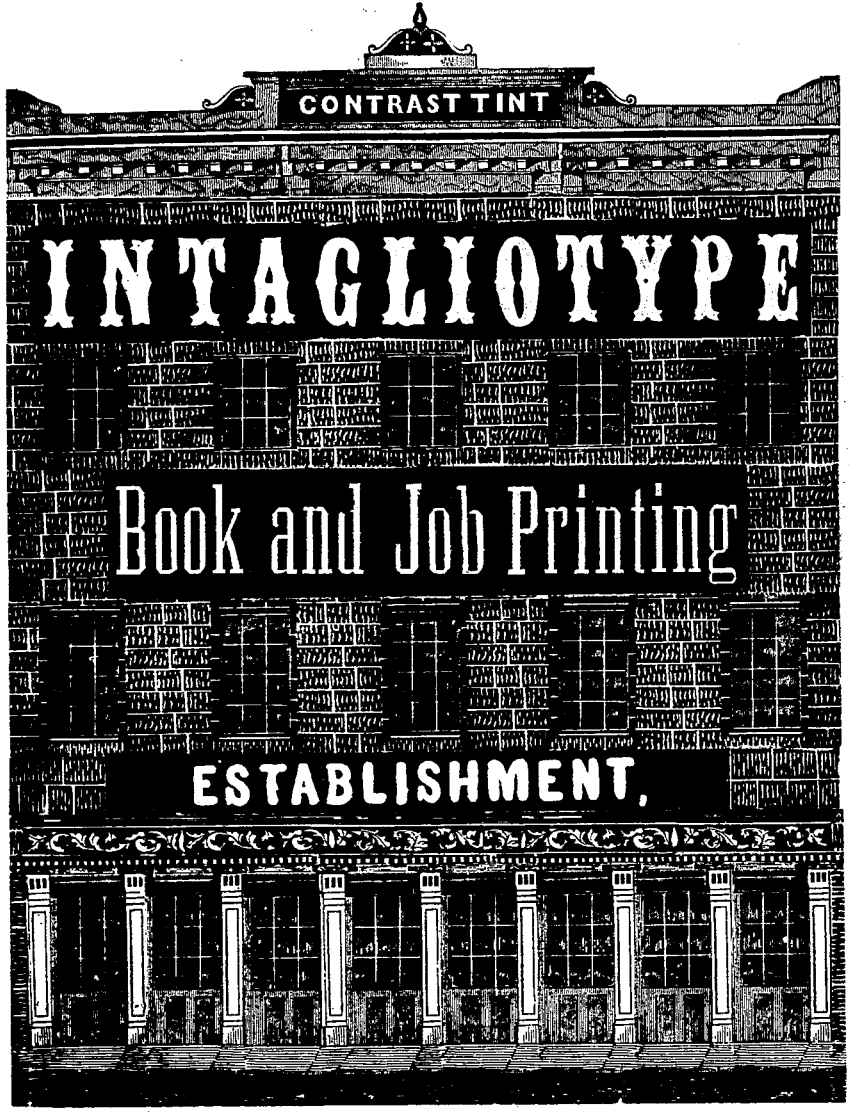
Witnesses
J. D. Law
M. N. Hutchinson
John Donlevy

*J. Donlevy,*
*Type.*
No. 53,587.　　　　　　　　　Patented Apr. 3, 1866.
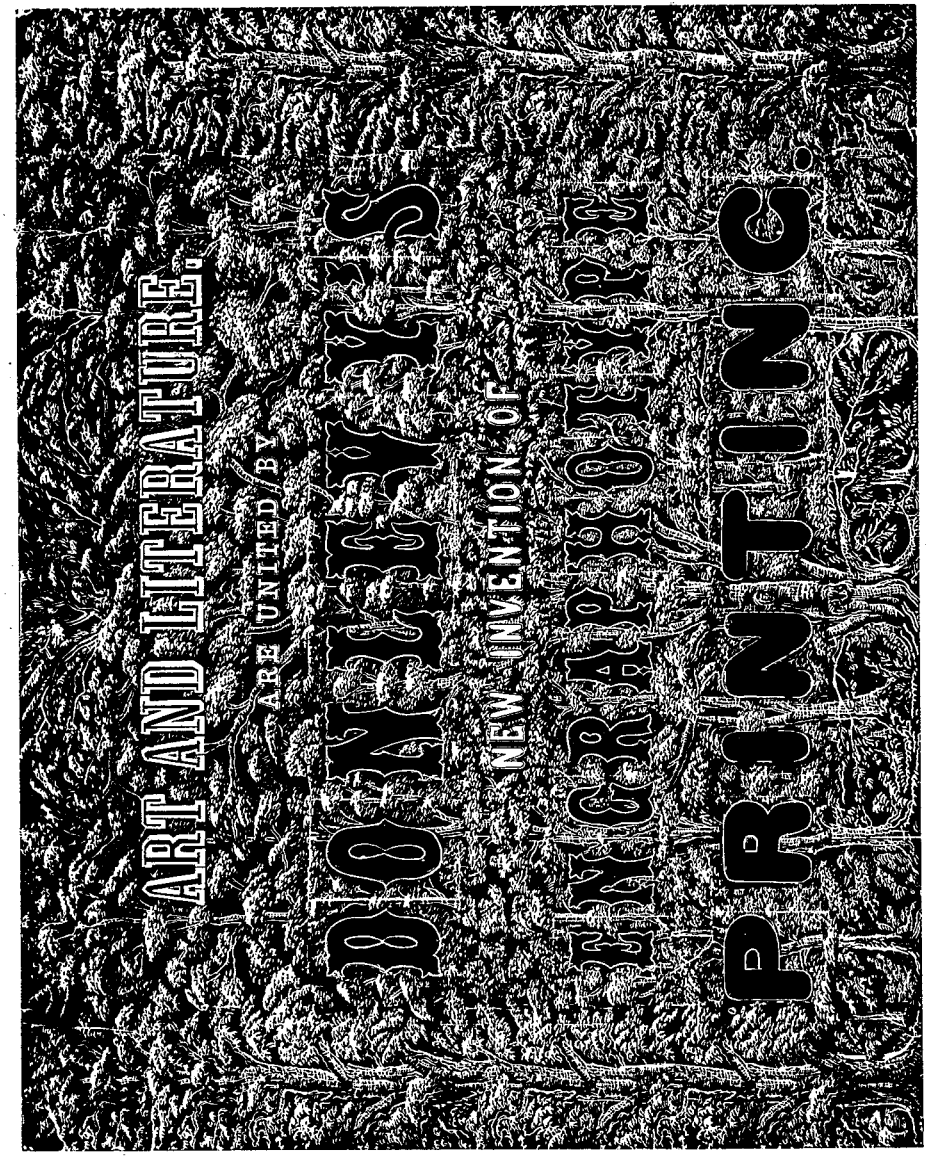

J. Donlevy,
Type.
No. 53,587.
17 Sheets, Sheet 17.
Patented Apr. 3, 1866.
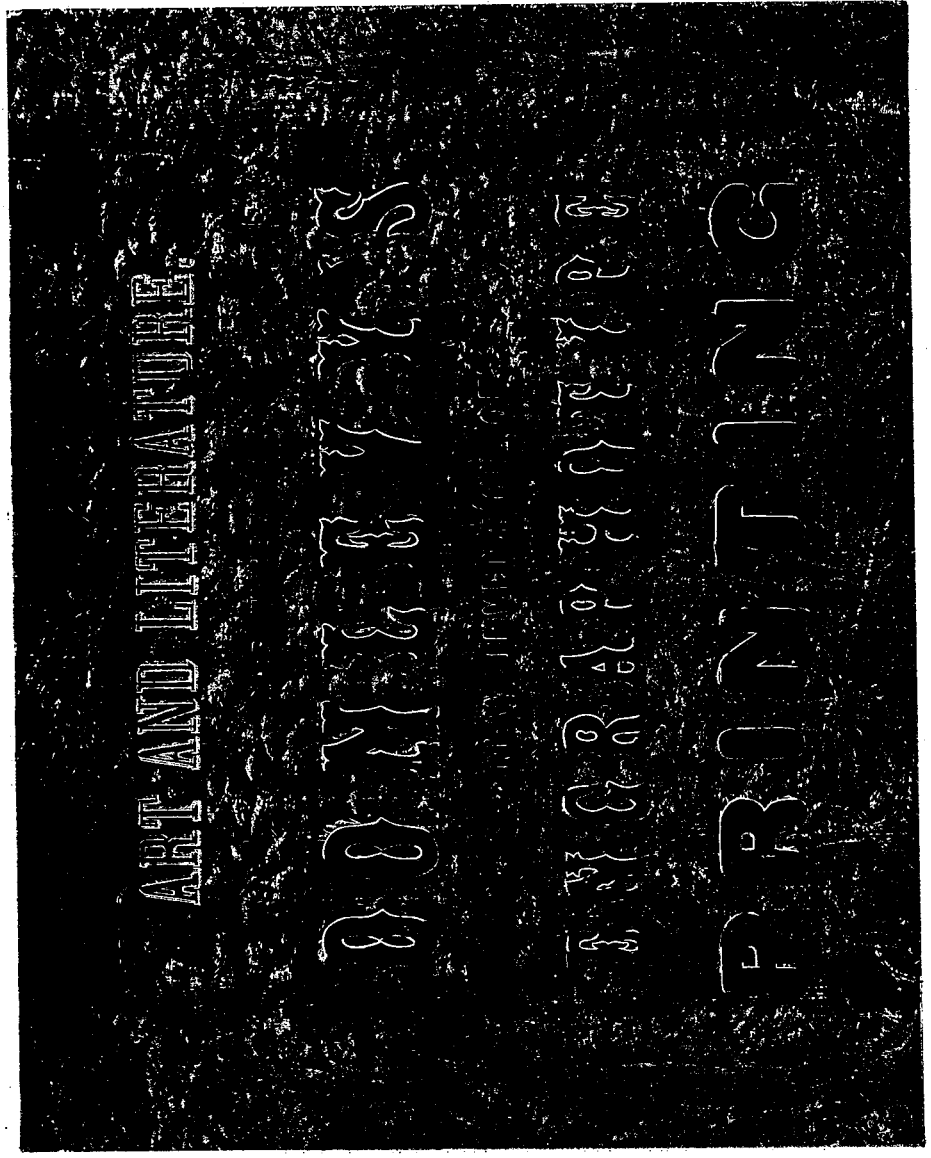
Witnesses
L. D. Law
M. N. Hutchinson
John Donlevy

UNITED STATES PATENT OFFICE.

JOHN DONLEVY, OF NEW YORK, N. Y.

IMPROVEMENT IN TYPOGRAPHIC PRINTING.

Specification forming part of Letters Patent No. 53,587, dated April 3, 1866.

*To all whom it may concern:*

Be it known that I, JOHN DONLEVY, of the city of New York, in the county of New York and State of New York, have invented certain new and useful Improvements in the Art of Typographic Printing, and in the construction, combination, and application of types, spaces, quadrats, reglets, and utilizing-lines for such purpose; and I do hereby declare that the following is a full, clear, and exact description thereof, and of their mode or manner of operation, reference being had to the accompanying drawings, and to the letters of reference marked thereon, and making a part of this specification.

My invention or improvements have reference to the utilizing of the spaces between the letters and lines of printing left blank in ordinary printing, whereby such spaces shall be made adequate to the production of decorative and pictorial effect, and also to the production of illuminated and polychromatic effect by means of types adapted for such purpose, and by the use of which any job-printer can produce the effects of the combination of engraving and letter-press printing by one operation.

Figure 1 is a perspective view of an ordinary relief-type. Fig. 2 is a like view of a type of the same letter in intaglio. Figs. 3, 4, and 5 are like views of the same letter in intaglio with connecting terminations adapting them to unite with a similar letter or space, or with utilizing lines and spaces when ornamented. Fig. 6 is an intagliographic letter adapted to print in combination with bas-relief letters, of which Figs. 7 and 8 are illustrations. Figs. 9, 12, and 14 are views of dark spaces and quadrats adapted to the production, in combination with intaglio letters, of a solid surface-tint. Figs. 10, 11, 13, and 15 are views of similar spaces and quadrats adapted to the production, in combination with intaglio letters, of figured surfaces. Figs. 16, 17, and 18 are views of interior-ornamented utilizing-lines adapted to combine with similar letters, spaces, and quadrats and produce an ornamented or figured surface. Fig. 19 is a like view of a dark interior utilizing-line adapted to combine with similar letters, spaces, and quadrats to produce a solid-surface tint. Figs. 20 and 21 are like views of exterior utilizing-lines—one plain and one ornamented—adapted to combine with similar letters, spaces, and quadrats and with interior lines.

I. One great and important object of my invention is the utilizing of the spaces between the lines and letters now left blank in ordinary printing by filling such spaces with sections or parts of a decorative or pictorial production, which sections or parts, when properly combined, are adequate to the production of decorative or pictorial effect, so that an impression from a form of my improved type will represent, in addition to the usual typographic text, a figured surface, art, industrial, or other design, pattern, or pictorial representation, which utilized surface, pattern, or pictorial representation is generally designed to constitute the background, while the subject-matter or text forms the foreground.

One of the great wants of typography has hitherto been the production of a tint field or ground to constitute a chromographic contrast between the printing-paper and the text of subject-matter printed. The present mode of forming type with letters raised above the body or shoulder of the type, as shown in Fig. 1, separates the letters from each other and prevents any artistic connection between them by which such a field tint or ground could be produced.

In ordinary typography a type, technically considered, consists of the shank, the beard, and the face. The shank is the body of the letter, the beard is that portion between the shoulder or top of the shank and the face, and the face is the form or shape of the type or letter from which the impression is taken. Consequently the body or base of the type and the beard and the face are at different and unequal elevations, so that the text or composed letters which constitute the subject-matter are so separated as to prevent the production of a field or ground.

In ordinary printing, also, the face of the type is in relief, and the text is printed from the face of the letters alone, leaving the spaces, quadrats, reglets, &c., sunk beneath the surface. The non-printing portions of the form represent the blank spaces in the printed impression, and in an average of general work constitute from one-half to seven-eighths of the whole surface, which, being thus uselessly wasted, closes every avenue to artistic effort and produces a bleak, isolated, and monotonous style in typography. This absence of artistic contrast is one of the principal defects of movable typography as at present used, and must exist because the peculiar style and monotonous nature of the type used afford no field for artistic effort. Hence the labors of the artist have been heretofore confined to the limited sphere of initial letters or isolated lines, except, in rare instances, in the case of illuminated or other styles of very expensive books, in which appropriate artistic borders have been specially designed and engraved to illustrate the text of a particular work. In fact, so limited is the field for artistic effort in modern typography that modern type-founders, in order to gratify the taste for novelty, have been obliged to return to and reproduce the unsymmetrical shapes and uncouth styles of letters which prevailed previous to the times of Baskerville.

My invention is based upon a principle the reverse of ordinary typography—that is to say, it is based upon the intagliographic instead of the relief style of graphic production. On this principle the letters and the sectional ornaments, Fig. 2 to 8, which embellish and utilize them are sunk beneath the printing-surface, and the spaces, quadrats, &c., Figs. 9 to 15, instead of being sunk beneath the printing surface, as in ordinary typography, are raised to and constitute an important portion of the printing-surface.

I introduce, also, a new and useful auxiliary to typographic operation, which I call "utilizing-lines," and which are adapted to combine with the text, and which are either figured or plain surfaces, according to the nature of the work required. Figs. 16, 17, 18, and 20 are illustrations of figured, and Figs. 19 and 21 illustrations of plain, utilizing-lines. The plain lines are intended to form a surface-tint or background of solid shade. The figured lines contain each a section of a pictorial subject, and they separate the lines of the text and form the pictorial background. They are designed to constitute a superior substitute for the present non-printing leads, reglets, &c., as well as to form a novel, useful, and extensive field for artistic effort. When a pictorial background for the production of such utilizing-lines is required it is drawn and engraved in intaglio, and then stereotyped, similar to any other description of work, with the exception of leaving dissecting-lines for cutting or dividing it after the engraving is stereotyped. Fig. 22 is a representation of such a plate, the dissecting-lines being in black. Or the drawing may be executed on separate pieces of wood or metal, and subsequently stereotyped and finished for combination with the text, care being taken to provide each of the smaller sections with terminating connections, by which they will unite imperceptibly with a different section, line, letter, space, or quadrat, and when combined constitute a harmonious typo-pictorial production.

The production of intagliographic effect, or that style of printing in which the subject to be printed is incised or sunk beneath the printing-surface and the impression given on the whole surface surrounding the characters or figures to be produced, though often essayed in initial letters and isolated lines, the utility of which was neutralized by the absence of appropriate printing-spaces, quadrats, and utilizing-lines, (such aids to typography being unknown previous to my present invention,) has never before been produced by typography, and therefore this beautiful and effective style of printing has hitherto been executed at great expense, either by engraving the subject on metal or wood or by the slow and laborious process of lithography.

By an invention patented to me on the 3d day of January, 1854, I greatly economized and facilitated the latter kind of intagliographic printing by casting plates from a form of outline-type laid upon a plate of glass or other smooth surface and running some plastic substance, such as plaster-of-paris or other composition of matter, between the form of types and the plate, to produce thereby a continuous surface, and as the contact of the plate with the projecting surface of the types prevents the plastic substance from entering the intagliographic letters or figures, they remain below the general surface produced by the projecting portion of the types and the plastic substance cast around them, and by then stereotyping this form a plate is produced presenting a smooth printing-surface with the required letters or figures sunk beneath such surface.

By my present invention I have reduced this style of printing to a simple system of typography which can be used without stereotyping, although in every kind or description of work of a permanent character stereotyping may be made use of with great advantage. According to this part of my invention now treated of intagliographic effect is produced by means of movable intaglio-types, in connection with type-high printing-spaces, quadrats, and utilizing-lines so formed as to have their surfaces on the same plane with the printing-surface of the types, so that when a stereotype cast or printed impression is taken therefrom a solid metallic surface or printed tint will be obtained, in which the letters will be sunk on the plate or appear either white on the printed impression or of a similar color to the paper or medium on which the impression is printed, thus obtaining a tint or ground from which the letters will appear to rise and present a bold and effective contrast to the field on which they are formed. Fig. 23 shows such an impression from a form of solid or plain surface intaglio-type, and Fig. 25 a similar impression from a form of figured-surface intaglio-type. This contrast is much increased by inclosing the subject in or connecting or surrounding it with an artistic illustration or appropriate ornament executed in a different style from the text and the field in which it is formed. This pictorial background or marginal illustration should be a representation or reproduction of some real object in nature, art, or art industry, simple or elaborate according to the character of the work, in order that this typo-pictorial illustration may constitute an appropriate embellishment to the text, subserve some useful purpose in popular art or education, and be distinctly distinguished from the anomalous borders of ordinary typography or the fortuitous forms composed in "flower" or "combination-border" type. Fig. 32 illustrates such an inclosing artistic border.

The utilizing marginal sections generally form a part of the pictorial subject formed by the central utilizing-lines, and are also designed to occupy the space previously left vacant or filled with anomalous typographic borders, which are now generally discarded by tasteful printers, (unless when specially designed for illustration at great expense,) as they seldom bear any relation to the text.

The utility of appropriate borders and ornaments as auxiliaries to typographic decoration has been long perceived and appreciated by the profession; but as previous to the introduction of utilizing-lines, which form an important part of my present invention, no mode of artistically connecting the text with pictorial forms so as to produce typo-pictorial effect was known, ordinary printers, in consideration of economy, were accustomed to the continual use of similar borders for the most discordant variety of subjects.

The emphatic effect and superior force of intaglio have long been felt and acknowledged; but, as previously intimated, the cost of engraving and the enhanced expense of printing from a solid-tint ground or field, in which the text was executed, prevented the popular use of the art. Then, again, the intagliographic style, when exclusively made use of, though more effective than the relief, is almost equally as monotonous, so that it is generally requisite to engrave additional illuminated or polychromatic plates to print in register with the intagliographic text in order to relieve or neutralize this monotony—a mode of procedure so expensive as generally to deter even enterprising business men from availing themselves of the advantages of this beautiful and effective style of art.

The introduction of contrast-tint type will obviate all these obstacles to the general introduction of intaglio, as a judicious arrangement of light and shade exhibited in the contrasting tints will neutralize the monotony and preserve the forcible effect of intaglio, as well as adapt it to print with the rapidity and economy of relief.

In order to illustrate this effect, instead of connecting the smooth-surface type together by means of plain printing-spaces, quadrats, and utilizing-lines, the surface of which is precisely similar to the types, I connect them with spaces, quadrats, and utilizing-lines decidedly dissimilar—that is to say, while the printing-surface of the letters is plain, the printing-surface of the utilizing-lines is figured or ornamented and adapted for arrangement, alternately or otherwise, with lines of intagliographic letters and with an appropriate pictorial representation, so as to produce in combination a sectional pictorial printing-surface. Fig. 32 is an illustration of such an arrangement. In this manner, by artistically contrasting letters, shades, lines, and tints with each other, a great diversity of style and effect may be produced in a single subject upon an intagliographic field or ground adapted to print in one or more colors.

Fig. 35 is an impression from a stereotype-plate produced from separate architectural type and sectional utilizing-lines. This figure, though but a rude illustration of the principle, gives a glimpse of the great field opened to typographic effort in the production of figured surfaces by the introduction of contrast-tint to typographic operation.

A form of types on this plan, when set up with spaces, quadrats, utilizing-lines, &c., all on one common plane, will print the entire surface of the paper, as shown in Fig. 24, with the exception of the incised letters, figures, or ornaments, which are below the printing-surface, and therefore types when thus made can be set up in forms like the ordinary types, print with equal rapidity, and after taking the required impressions (or a stereotype fac-simile therefrom) may be distributed and again set up with printing utilizing-lines of a different description adapted to produce any other form, and thus present the same advantage in this description of printing as ordinary relief-type, with the addition of pictorial representation, and a more effective, and consequently a superior, style of typography.

The great importance of even plain utilizing-lines may be inferred from the fact that without them it would be impossible, or at least impracticable, to print directly from or produce a stereotype-plate of even, plain, solid-surface intaglio-type. An illustration of this is exhibited in Figs. 23 and 24. Fig. 23 is purposely printed with a thin varnish-ink, in which the white lines show the separate letters, spaces, &c., which are concealed in Fig. 24, printed with a full-bodied appropriate ink, which conceals the separate breaks and produces a uniform tinted surface.

It will be observed that the uniform utilizing-lines justify the type evenly, wedge them firmly together, and form, as it were, solid sectional ink-distributers for the production of uniform tinted surfaces, by which the breaks between the separate type, which they firmly bind together, are concealed in printing, and these utilizing-lines also form a solid sectional base of operation for obtaining molds for stereotyping, in which the breaks between the separate types, being represented by elevations in the plaster mold, as hereinafter explained, are easily cut away with a common chisel, and a uniform, efficient, and economical plate produced, equal in every respect to the wooden blocks, metallic plates, or lithographs which printers are continually accustomed to have engraved or lithographed at great expense for decorative printing purposes.

The absence of even plain utilizing-lines has heretofore rendered intaglio-types unavailable for the purpose of producing uniform-tint printing-surface plates in stereotyping, and also for the production of entire forms in printing. Initial letters in intaglio are frequently used, and sometimes, in rare instances, an isolated line of intaglio letters; but the previous want of utilizing-lines to properly justify and bind the separate type and form solid sectional positions for the equal distribution of the ink has made intaglio-types so troublesome and ineffective that they are seldom, if ever, used. But the vital utility and paramount importance of utilizing-lines to typographic operation will be exhibited in the production of figured or ornamental printing-surfaces generally, and in contrast-tint, illuminated, and polychromatic production especially. Their use greatly extends the range and exalts the character of the typographic art, and in a popular point of view really renders it a most important department of the arts of design.

II. The second part of my invention has relation more particularly to the production of illuminated or polychromatic printing, which is produced by the use and combination of plain or solid tint surface types with figured-surface printing-types, so that when both are printed in register an illuminated or polychromatic style of effect will be produced. Some parts of what has before been written will be found to have a bearing upon and be connected with this portion of my invention.

This part of my invention consists, first, in the use of plain-surface printing-types the letters of which are sunk beneath their printing-surfaces and combined with similar surface-tint printing-spaces, quadrats, and utilizing-lines, so that all shall be on one plane and form a combined printing-surface; second, in the use of types superficially similar to those just described, except that their printing-surfaces are incised, figured, or decorated, so as to combine with type-high spaces, quadrats, reglets, and utilizing-lines the surfaces of which are similarly incised, figured, or decorated, the ornaments being so designed that the terminating connection of each letter, which, when set up, constitutes the junction of the several type, appears lost or becomes imperceptible in the general effect of the whole; and, third, in the production and use of bas-relief letters and figured, lined, stippled, or other appropriate ornaments adapted to constitute a field or ground for the effective display of the type, the body of which, like that of the previous type, is elevated to and is on the same plane with the surface of the letter, the letter being generally similar to the letters ordinarily produced in dark relief, while its surrounding surface is incised or ornamented in intaglio or bas-relief, with a terminating connection similar to the intagliographic letters previously described.

Bas-relief type is especially designed to exhibit an effective style of typographic contrast in the combination of lines and figures, lights and shades, and to produce, in combination with plain or figured intaglio-types like those described hereinbefore, a most economical and effective style of illuminated or polychromatic effect, the figured surface and bas-relief being accurately arranged to register with the plain-surface type, without ornaments, for the purpose of producing illuminated or polychromatic effect.

To enable any one acquainted with the use of ordinary types to work or apply my said invention or new manner of printing, I will describe the details thereof, reference being also had to the accompanying drawings, in which—

Fig. 23 is an impression from a form of intagliographic type like that represented in Fig. 2, composed of letters, spaces, utilizing-lines, and marginal sections, and printed with thin ink to show the manner of their combination. Fig. 24 is an impression of a like form of type, but printed with a thick pigment, which conceals the surface of its sections, and printed in color and adapted to register with Fig. 25. Fig. 25 is an impression from an entire form of intagliographic type like that represented in Fig. 2, composed of letters, spaces, utilizing-lines, and marginal sections, the surfaces of which are figured and adapted to print in register with Fig. 24. Fig. 26 is an impression produced from printing the form shown in Fig. 24 in register with and upon the impression shown in Fig. 25. Fig. 27 is an impression from an entire form of bas-relief type adapted to print in register with Fig. 28, which is a form of plain solid-surface tint-type. Fig. 29 is an illuminated impression produced from printing Figs. 27 and 28 in register. Fig. 30 is an impression from a stereotype-plate produced from solid-surface intaglio tint-type. Fig. 31 is an impression from a similar plate lined. Fig. 32 is an impression from a stereotype-plate produced from a combination of the solid and linear lines of letters shown in Figs. 30 and 31, and surrounded by marginal sections adapted to exhibit the effect of contrast-tint in a single color. Fig. 33 is an impression from a stereotype-plate produced from figured intaglio-type. Fig. 34 is an impression showing the chromo-linear effect produced by printing Fig. 33 in register with the linear plate, Fig. 31. Fig. 35 is an impression of architectural type. Fig. 36 is an impression from a stereotype-plate produced from type of bas-relief. Fig. 37 is an illuminated impression produced by printing Fig. 36 in register with a form of solid-surface tint-type, as before explained.

The types, spaces, quadrats, interior and exterior utilizing-lines should be made equal in depth, and constructed to correspond, when set up, with the plane of the printing-surface of the type.

Great care should be taken to preserve uniformity in spacing, particularly in the composition of duplicate forms for printing in register with each other, in the production of illuminated or polychromatic printing, in which such uniformity of spacing is essential. No difficulty can, however, occur to the careful compositor in this particular, as the solid-surface intaglio tint-types, letters, spaces, quadrats, and utilizing-lines are made superficially similar to the figured-surface intaglio and bas-relief letters, spaces, quadrats, and utilizing-lines, with which they are arranged to register with infallible accuracy.

The form or duplicate register-forms being composed are fastened with furniture, locked up in a chase or chases, and made ready for printing, as usual in ordinary typography.

Pictorial backgrounds of great variety of size and style, from the largest poster to the smallest vignette, may be made and adapted to arrange or combine with the various lines, sizes, and styles of type, for the general production of typo-pictorial effect, without recourse to stereotyping. Indeed, so extensive is the field for artistic effort, so numerous the modes by which plain and figured letters, spaces, quadrats, and utilizing-lines can be artistically connected together and combined in the production of printing-surfaces by my invention, that every description of general work for transient purposes can be readily executed by ordinary printers in remote localities without any necessity for stereotyping, and with such beneficial results in point of popular art-education that the ordinary interchange or circulation of address or business cards may become an interchange of artistic ideas, and the very handbills distributed through the streets and the placards posted in the thoroughfares will make the millions familiar with forms of truth and beauty.

But although for general work of a transient character stereotyping is unnecessary, yet in the production of illuminated books and in the higher decorative departments of the art it will be frequently found advisable, as even in ordinary printing every description of work demanding any degree of permanence is now generally stereotyped. In ordinary printing, however, a stereotype-plate is but a fac-simile of the form from which it is taken, and the graphic character of relief-type leaves no room for artistic effort in the process of stereotyping. By my present invention, on the contrary, the effect of the work may not only be improved, but its style may be completely changed through stereotyping. This can be effected because the printing-surfaces of the letters, spaces, quadrats, and utilizing-lines of a form of type produced or arranged according to my invention are all on one plane, and when a mold is taken therefrom every hollow or incision in the subject is elevated in the mold. Any portion of these elevations may be easily cut away, the connecting parts smoothed, new gradations of tints and effects produced, and the whole altered and improved with great facility and economy. The production of such results is impossible in stereotyping letters or engravings in ordinary relief, because the letters and lines in a stereotype-mold taken therefrom, instead of being elevated, (as in my invention,) are depressed or sunk, and hence subsequent improvement is impossible.

A simple illustration of the improvement effected through stereotyping is exhibited in the impression of a form of bas-relief type, Fig. 27, printed directly from the type, in which the junctions of the utilizing-lines are purposely left perceptible. The effect is improved in a stereotype impression of the plate, Fig. 29, printed in colors, in which the perceptible junctions are cut away with a chisel in the plastic mold of the types previous to stereotyping, and a new surface furnished for touching up or improving and finishing the plate in a superior manner.

A more vivid illustration of this economical facility for improvement by stereotyping is exhibited in Figs. 36 and 37, which was orignally simply a fac-simile of Fig. 25, to which three appropriate lines have been added. In a stereotype taken therefrom the plaster was cut away from such portions of the mold as it was deemed advisable, the intaglio-type letters thus changed to bas-relief, and new space for alteration and improvement obtained. The result is observed in the altered and improved aspect of the pictorial background and the general effect of the whole.

The lined plate, Fig. 31, is an illustration of an entire change in the style of the work. It was first a fac-simile of the intaglio solid-surface tint-plate, Fig. 30, but its surface effect is entirely changed by being ruled. Two lines from this ruled plate, combined with a line from the solid-surface tint-plate, Fig. 30, and with the figured marginal sections which surround them, produce the contrast-tint effect exhibited in Fig. 32.

Another fac-simile stereotype cast of Fig. 30, instead of being ruled, is figured, as shown in Fig. 33, and when printed in register with the ruled plate, Fig. 31, produces the new effect of style exhibited in Fig. 34.

The great importance of contrast-tint in typographic operations is almost inestimable, as by it every diversity of tint, peculiarity of manner, and variety of style can be rapidly produced, and with great elegance and economy. Figs. 32 and 35 are rude illustrations of the importance of the principle even in the production of a single color; but to be properly appreciated its effects must be exhibited in typographic illumination and polychromatic work generally.

The new chromographic effect produced by the combination of two or more colors in the production of an entire field or ground, when impressions are printed in register, is equally applicable to the production of the greatest diversity of contrast-tint in typographic illumination. For example, it will be observed that Fig. 28, which is an impression taken from the plain-surface intaglio tint-plate with a green field or ground, when printed in register with a figured-surface plate, Fig. 27, printed in red, changes the entire green field or ground to a brown, Fig. 29, with the exception of the letters, the relative positions of which, being precisely similar in both sets of plates, remain white, as in the illuminated intagliographic plate, Fig. 24, or appear in their original red color, as in the illuminated bas-relief plate, Fig. 29.

This mode of procedure is especially applicable to the development and display of contrast-tint in typographic illumination, in which polychromatic fields or grounds of the greatest diversity of style and effect may be economically and elegantly executed, especially in connection with bas-relief letters, which may also be ornamented to produce a diversity of illuminated effects by having duplicate fonts of letters different portions of which are artistically adapted to print in and illuminate each other, at the same time that they illuminate the contrasting tint or pictorial backgrounds. In this way the greatest variety of illuminated and polychromatic results may be produced in an economical and most effective manner, as the previously useless but now utilized spaces or portions of paper left blank in typography may be adapted to the reproduction of general pictorial and polychromatic effect, give a new, powerful, and unprecedented impetus to the production of illuminated literature, and make the typographic art the most commercial of all the arts of embellishment.

What I claim as my invention, and desire to secure by Letters Patent, is—

1. The utilizing the spaces between the letters and lines of text left blank in ordinary printing by filling such spaces by means of utilizing-lines with a pictorial background, divided into sections and adapted to arrange, alternately or otherwise, with lines of text, spaces, quadrats, &c., substantially as and for the purposes set forth.

2. The use and application of improved intaglio-type with plain surfaces, which adapt such type to artistically unite with type-high spaces, quadrats, and utilizing-lines corresponding to and when set up on a level with the surface of the type, for the purpose of producing stereotype-plates adapted for subsequent ornamentation.

3. The combination of the type previously described as bas-relief type with plain-surface intaglio-type, for the purpose of producing illuminated and polychromatic effect.

4. The combination of plain-surface intaglio-types with figured-surface utilizing-lines, or figured-surface intaglio-types with ornamented utilizing-lines, by which is produced a new and useful style of contrast-tint typography, substantially as and for the purposes set forth.

5. I do not claim the composition of pictorial effect by the use of decorative type generally known as "composition-border type," nor do I claim the production of pictorial effect by means of the "elements of form" described in the specification of Letters Patent granted to me in 1854; but I claim as my invention the artistic dissection of any pictorial or decorative subject in spaces, quadrats, and utilizing-lines, and their combination with each other and with letters or lines of letters or text, so as to reproduce from the whole a typo-pictorial subject, substantially as and for the purposes set forth.

JOHN DONLEVY.

Witnesses:
S. D. LAW,
M. N. HUTCHINSON.